United States Patent [19]
Quadracci et al.

[11] Patent Number: 5,285,238
[45] Date of Patent: Feb. 8, 1994

[54] METHOD FOR FORMING A GRAPHIC IMAGE WEB

[75] Inventors: Thomas A. Quadracci, Brookfield; Thomas R. Wickert, Butler, both of Wis.

[73] Assignee: Quad/Tech, Inc., Sussex, Wis.

[21] Appl. No.: 60,020

[22] Filed: May 10, 1993

Related U.S. Application Data

[63] Continuation-in-part of Ser. No. 929,154, Aug. 12, 1992.

[51] Int. Cl.⁵ .................. G03B 27/32; G03B 35/14
[52] U.S. Cl. ................................. 355/77; 355/22
[58] Field of Search ............... 355/22, 77; 354/112, 354/115; 352/85, 86

[56] References Cited
U.S. PATENT DOCUMENTS

4,478,639 10/1984 Smith et al. .................. 430/9
4,494,864 1/1985 Smith et al. .................. 355/22

Primary Examiner—Richard A. Wintercorn
Attorney, Agent, or Firm—Michael, Best & Friedrich

[57] ABSTRACT

The present invention is a method for forming a graphic image web including a precursor image web combined with a congruent lenticular lens to produce the illusion of three dimensionality in a visually perceptible image on the graphic image web. To produce this illusion of three dimensionality, an image field including an object is defined. The object is imagewise exposed onto a photographically sensitive element over a plurality of spatially disparate views through a lenticular lens having a prescribed optical geometry. Upon developing the latent image on said element, it is printed to form the precursor image web. The congruent lenticular lens is then combined with the precursor image web to create the graphic image web having graphic information imparted with the illusion of three dimensionality.

15 Claims, 6 Drawing Sheets

METHOD FOR FORMING A GRAPHIC IMAGE WEB

CROSS REFERENCE TO RELATED APPLICATION

This is a continuation-in-part of U.S. Ser. No. 07/929,154 filed Aug. 12, 1992.

TECHNICAL FIELD

The present invention relates generally to methods for creating the illusion of three dimensionality of a graphic image in printed web form and more particularly to a method for forming a graphic image web by a lamination or coating technique in which a precursor image web is combined with a lenticular lens to yield a graphic image having photographically acceptable quality.

BACKGROUND OF THE INVENTION

It is known in the art to fabricate generally planar display devices which include an image sheet and a lenticular lens sheet which, in combination, give the image and appearance of three dimensionality. The lenticular lens sheet and the image sheet must be aligned properly to avoid a distorted image. The components have heretofore been in sheet form because the process of combining them is usually manual to ensure necessary registration.

The illusion of three dimensionality requires the image originally be made with a special three dimensional or stereoscopic camera, photographing the desired object from a plurality of angularly displaced positions. Such a camera typically uses a photosensitive film disposed behind a lenticular screen. The lenticular screen is positioned adjacent the photosensitive film so the focal point of each lenticule generally coincides with the front surface of the film. Thus, the image of the object is focused into a narrow image band which is exposed in the film. As the camera is shifted to the next angular position, the lenticular screen is also shifted slightly. A subsequent picture image of the object from the new angular position is then exposed into a separate image band in the film adjacent the preceding image band. Each time the camera is moved to a new angular position, the object is photographed and the image is exposed in the film as a similar, narrow image band adjacent the previously formed image band, until a series of image bands representing different views of the object is created. To avoid overlap of image bands, the lenticular screen is only moved a distance equal to the width of a single lenticule as the camera is moved through its full angular range. This collection of image bands, which is formed under a single lenticule, may be called an image element. Each image element is approximately the width of a single lenticule and includes all of the condensed views of the object.

Cameras of this type are disclosed in Stockbridge et al., U.S. Pat. No. 3,380,360, issued Apr. 30, 1968 and Bonnet, U.S. Pat. No. 2,508,487, issued May 23, 1950. Both of those patents disclose three dimensional or stereoscopic cameras used to photograph objects from numerous angular positions where the photograph taken at each position is exposed on a film as a linear image band.

Once the object is photographed from the various positions, the film may be developed the same as any other photographic film, but the resulting image is a compilation of the numerous adjacent image bands. Each image band represents the object from a given angle, albeit in a focused or compressed form. This can provide the overall image with a somewhat distorted look to the naked human eye. However, when the developed image is combined with a lenticular screen or sheet having lenticules of approximately the same size and focal length as the lenticular sheet used to expose the film, the image becomes clear to the human eye as viewed through the screen.

The lenticular sheet must be placed over the image elements so the focal point of each lenticular lens coincides with the front surface of the image sheet. The image will appear to be three-dimensional because the observer is viewing the image through the lenticular sheet from a slightly different angle due to the lateral spacing between his eyes. In effect, this allows each eye to focus on a different image band representing different views of the photographed object from separate angles, thereby giving the viewer the illusion of a three dimensional image.

In the past, the lenticules and image elements were relatively wide and each lenticule and to be perfectly aligned over each image element to obtain a clearly defined three dimensional image. It has been difficult to obtain precise alignment and impossible to mass produce three dimensional images efficiently and economically. Typically, the lenticular sheet has been manually positioned over the image sheet and then carefully adjusted to eliminate moire line or interference. This is a time consuming, inefficient and expensive task.

Further difficulties exist in mass producing three dimensional sheets for use in publications such as magazines due to the size of the lenticules and the consequent thickness of the lenticular lens sheet. However, larger lenticules have longer focal lengths and necessitate a thicker lens overlay so the focal point of the lenticule is approximately adjacent the image elements on the image sheet. This, of course, leads to a relatively thick composite sheet which is not suitable for magazines or other printed media that require a thinner sheet dimension. Making the sheet sufficiently thin to be used in magazines requires the lenticules to be extremely small thus making it more difficult to form the lenticular lens sheet and properly align it with the image sheet. The required precision has made the use of efficient, high output machinery difficult.

It has long been desirable but unattainable to make both the image sheet and the lenticular lens sheet in continuous form and then combine them at a rapid pace with precise registry to produce a finished product having photographically acceptable quality. Standard printing methods could then be used to reproduce the images in continuous form. Though techniques have been developed for creating a lenticular lens in continuous form, and certain methods and devices have also been used in an attempt to combine an image web with a continuous lenticular lens, none of these devices is able to produce a thin, flexible lenticular image composite for economical use in the production of, for example, magazines while maintaining the precision necessary to produce quality images having the illusion of three dimensionality without interference lines or distorted appearance.

In three patents to Conley, U.S. Pat. No. 4,420,502, issued Dec. 13, 1983, U.S. Pat. No. 4,414,316, issued Nov. 8, 1983, and U.S. Pat. No. 4,420,527, issued Dec.

13, 1983 an apparatus and method for making a composite sheet material are disclosed. A transparent base web is directed onto the surface of a first roll and advanced along an arcuate path around the first roll and then through a narrow gap disposed between the first roll and a second roll. Before the transparent base web passes between the first and second rolls, a flowable, uncured actinic radiation-curable thermosetting resin is directed onto the web behind the narrow gap. The second roll includes grooves so that, as the resin covered web passes through the narrow gap and around the second roll, lenticular formations are made in the flowable resin. Ultraviolet radiation is directed through the transparent base web and into the flowable resin layer while it remains in contact with the second roll. Thus, the flowable resin is cured into a composite lenticular lens sheet.

Such a process can produce small, well defined lenticular lenses. However, the difficulty remains in properly joining such a lenticular lens with a corresponding image web in a manner that avoids distortion of the image. Typically, the lenticular lens will still need to be cut in sheets and then carefully aligned by hand with a corresponding image sheet. It would be advantageous, and meet the long-felt need summarized above, if such a lenticular lens could be precisely aligned and combined with the corresponding images while the image sheet and the lenticular lens both remained in continuous form. This would greatly increase the efficiency and volume of the finished web resulting in a very economical product.

Other patents disclose methods and devices for making lenticular lens products but none with the accuracy or precision that would allow the finished product to be used in typical publications such as magazines. For instance, Jerothe et al., U.S. Pat. No. 3,264,164, issued Aug. 2, 1966, discloses a device which makes a laminated, flexible fabric-like material having interesting characteristics of color and depth. However, precise accuracy is not necessary since one of the purposes of the patented device is to produce images having a moire effect. Additionally, that approach uses colored lines and various colored shapes placed at different depths between cumulative flexible sheets. In the Jerothe et al. device, a relatively thick sheet is used for the formation of the lenticular lens. The lenticular lens sheet is laminated with various films and the resulting laminate passes between a pressure roll and a gravure roll where surface ribs or lenticular lens type ribs are formed by pressing the relatively thick lens forming sheet against the gravure roll. That device, however, cannot be accurately controlled to make extremely small accurate lenses in alignment with the image bands of an image web to yield photographically acceptable image quality.

Leach, U.S. Pat. No. 3,565,733, issued Feb. 23, 1971 discloses an apparatus for making a composite web from paper web combined with melted plastic. In Leach, a paper web, which can include an image, is passed between a pressure roll and a coating roll and then around a chilled embossing cylinder. A melted plastic is poured onto the coating roll which brings the melted plastic into contact with the paper web. This combined paper web and melted plastic is immediately brought into contact with the surface of the chilled embossing cylinder which solidifies the melted plastic leaving lenticular lens-type formations in plastic. A problem with the Leach apparatus is that it does not provide for the precision alignment of the lenticular lens formations with the image elements on the image web. This prevents the constant replication of high quality images having the appearance of three dimensionality without distortion. Additionally, meltable plastic will not retain its proper shape under the rigors of magazine use and shipping which can tend to place the lenticular lens formations under harsh conditions of pressure and heat. Once the lenticular lenses degrade, the three dimensional effect is lost. See also U.S. Pat. No. 3,607,340 to Stroupe issued Sep. 21, 1971.

In Lemelson, U.S. Pat. No. 3,146,492, issued Sep. 1, 1964, an apparatus is disclosed which produces a multiple image sheet display on a continuous basis. In Lemelson, an impressionable sheet is laminated with a plurality of sheets and then passed through a pair of rolls. One of the rolls is an embossing roll which creates lenticular formations in a face of the impressionable sheet. The apparatus is similar to those mentioned above in that it is difficult to form precision lenticules in the solid web without which an image of photographically acceptable quality cannot be reliable and repeatedly reproduced. Additionally, there is no way for the machine to provide precise alignment of the image elements with the lenticules.

The present invention addresses the foregoing drawbacks involved in making a precision lenticular lens image web having three dimensional image characteristics with photographic quality.

SUMMARY OF THE INVENTION

The present invention provides a method for forming a graphic image web including a precursor image web combined with a congruent lenticular lens web or coating to produce the illusion of three dimensionality in a visually perceptible image on a graphic image web. The method includes the steps of defining image field including an object to be viewed. This object is then imagewise exposed onto a photographically sensitive element over a plurality of spatially disparate views through a lenticular lens having a prescribed optical geometry. The latent image is developed on the element and the developed image is printed to form the precursor image web. The precursor image web and the lenticular lens web or coating are optically combined to create the graphic image web having graphic information of photographically acceptable quality imparted with the illusion of three dimensionality.

Additionally, the method provides for, optically aligning the precursor image web and the lenticular lens web or coating during translation of both webs. The lenticular lens web or coating includes a plurality of lenticules which are aligned with a plurality of image elements printed on the precursor web to impart graphic information of photographically acceptable quality with the illusion of three dimensionality. The photographic quality is facilitated by producing a lenticular lens web or coating having sufficient density of lenticules or by using a registration assembly to laterally register the lenticular lens web or coating with the precursor image web.

The invention provides for the illusion of three dimensionality in a two dimensional image. A person viewing the image on a precursor image web will see what appears to be and what is a two dimensional image. The image is a collection of disparate condensed views of the object in the image field as created through the lenticular lens of a stereoscopic camera. After aligning the lenticular lens web or coating over the precursor image web, the individual viewing the two dimensional image through the lenticular lens will then see what appears to be a three dimensional object. This illusion of three dimensionality is created by the optical configuration of the lenticular lens which is disposed between the image contained on the precursor image web and the eyes of the individual.

BRIEF DESCRIPTION OF THE DRAWING

The invention will now be described with reference to the accompanying drawing, wherein like numerals denote like elements, and.

DETAILED DESCRIPTION OF THE PREFERRED EMBODIMENT

The present invention relates generally to methods for producing a printed graphic image having the illusion of three dimensionality and, more specifically, to methods for doing so in which the components are web or continuously fed. The methods of the present invention are characterized by their ability to achieve a finished graphic image having photographically acceptable quality. While photographic quality of a printed image is a complex function of many production variables, ranging from the quality of the optical equipment, grain size and speed of the film, the quality and type of the printing equipment and selected printing process, it can be reduced to a more subjective level. Quality can more conveniently be related to the ability of the observer to differentiate the structure in the finished printed image; for example, the ability to distinguish qualitatively and quantitatively facial features in portraits, (tree) limbs and foliage in panoramic vistas, and the like. When considered in the context of the present invention and the ensuing description, photographically acceptable quality thus refers to a benchmark measurement of clarity in the finished three-dimensional view which is not materially, qualitatively distorted when compared to the precursor image. This is unlike the prior art: methods capable of adaptation to web-fed or coating operation cannot achieve acceptable quality, this is attainable only through labor intensive manual operation using sheet components.

Referring now to the figures of the drawing, a method for forming a graphic image web will now be described. As shown generally in FIG. 1, a three dimensional or stereoscopic camera 10 is used to create an image which, when developed, will give the illusion of three dimensionality when combined with a lenticular lens web having the requisite optical geometry. An image field 12 includes an object 14 which is to be photographed. A single object 14 is used for illustrative purposes, but this should not be deemed as limiting image field 12 to a single object. For instance, numerous objects could be included in the image field even to the extent that image field 12 is filled with various objects as would be the case when photographing certain scenery. Often, however, when creating stereoscopic images, it is desirable to have the object or objects in a relatively narrow plane or lateral field of view to create an enhance three dimensional effect.

Figure 1:
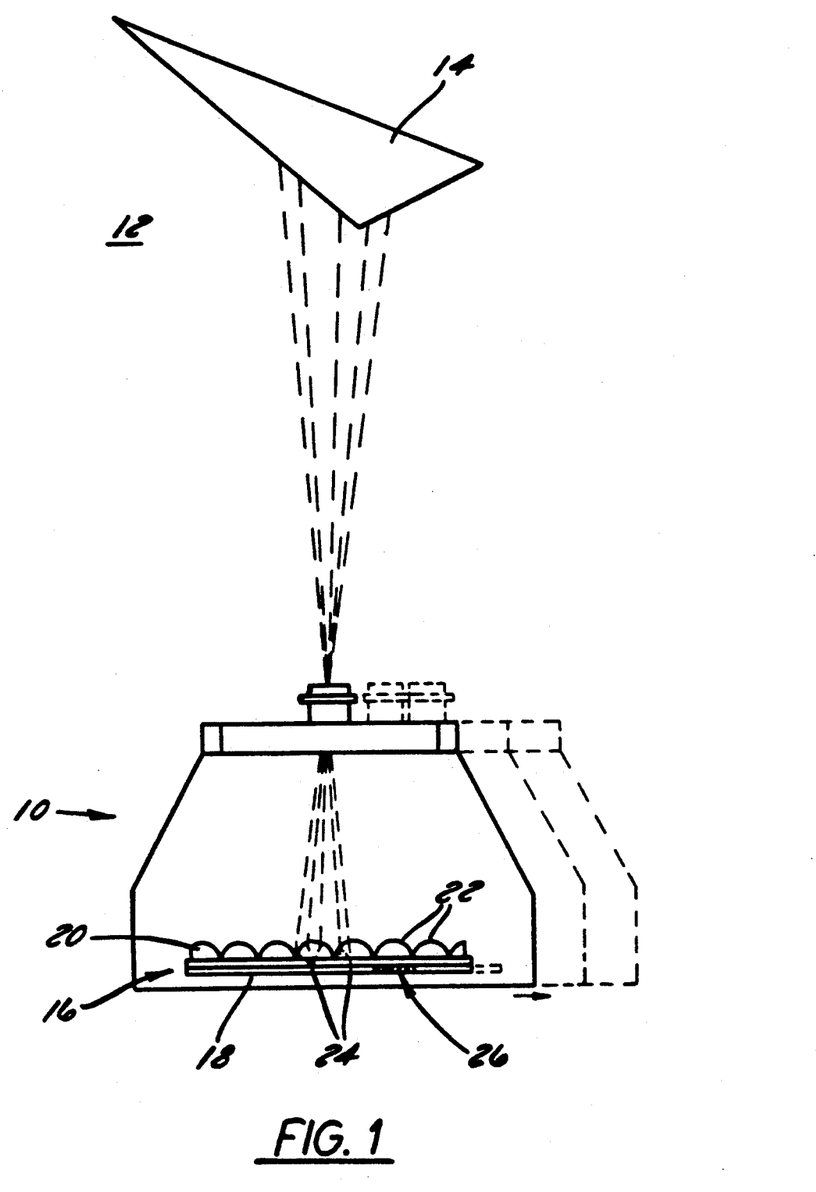
FIG. 1 is a schematic view of an object being exposed on photographic film through a lenticular sheet.

Stereoscopic camera 10 is mounted on a device(not shown) which allows it to be moved through a plurality of spatially disparate positions (shown in phantom) to obtain spatially distinct views of object 14. Each of these spatially distinct views is exposed through a lenticular film assembly 16 which includes a photographically sensitive element 18, such as photographic film, combined with a superimposed lenticular lens 20. As light, reflected from object 14, enters camera 10 as it passes through lenticular lens 20 and in focused into narrow condensed bands exposing photosensitive element 18 along narrow image bands.

In the preferred embodiment, lenticular lens 20 and photosensitive element 18 are relatively laterally movable. Photosensitive element 18 is preferably mounted in a mechanism (not shown) which moves it in proportion to the movement of camera 10. Thus, as camera 10 moves from one position to the next, photosensitive element 18 will move slightly along the length of lenticular lens 20 (shown in phantom). By moving element 18, the light reflected from object 14 at each adjacent camera position is focused by lenticular lens 20 into narrow bands adjacent the narrow image bands exposed on photosensitive element 18 at the previous camera position. Object 14 is thereby imagewise exposed at different locations along photosensitive element 18 with each exposure location corresponding to one of the spatially distinct views of the object obtained at one of the camera positions.

More particularly, lenticular lens 20 includes a plurality of lenticules 22 each having a given, preferably similar focal length depending on the size and the curvature of the lenticules. When object 14 is photographed, light reflected from object 14 enters camera 10 and strikes lenticular lens 20. Each lenticule 22 focuses the light towards its focal point. Preferably, photosensitive element 18 is disposed approximately in line with the focal points of the plurality of lenticules 22. This insures that light striking each lenticule converges into a narrow band at photosensitive element 18, creating a plurality of narrow condensed image bands 24 where the light focused by each lenticule exposes element 18.

Stereoscopic camera 10 is then moved to an adjacent location which gives a spatially disparate or distinct view of object 14. As camera 10 is moved to the next position, lenticular lens 20 is moved slightly with respect to photosensitive element 18 so that this view of object 14 will be focused on element 18 by lenticules 22 along narrow image bands 24 adjacent the prior image bands 24. Preferably, as camera 10 is moved through its full range of positions, lenticular lens 20 is moved with respect to photosensitive element 18 over a distance approximately equal the width of one lenticule 22. This will ensure that the image bands 24 created at each position of camera 10 will adequately expose the entire surface of photosensitive element 18 while preventing overlap of the image bands 24 formed under one lenticule with those formed under the adjacent lenticule.

When photosensitive element 18 is completely exposed, it will include a plurality of image elements 26. Each image element 26 is of approximately the same width as the width of each lenticule and includes a plurality of image bands 24 representing the various spatially disparate views of object 14 taken from and corresponding to the different positions of camera 10. In the most preferred embodiment, camera 10 is continuously moved through its range of positions with its shutter held open. Simultaneously, lenticular lens 20 is continuously moved laterally with respect to photosensitive element 18 in an amount generally equal to the width of one lenticule. This provides for uninterrupted imagewise exposure of object 14 onto photosensitive element 18 so that there are no visually discernable breaks or gaps between image bands 24. Instead, image elements 26 each comprise the focused composite of the spatially disparate views obtained when camera 10 is moved through its range of motion while object 14 is continuously exposed along element 18.

If camera 10 is moved through a substantial range of positions, it is preferably moved along an arcuate path so that the distance between object 14 and camera 10 remains constant. However, if the spatially disparate views of object 14 are created with minimal motion of camera 10, then camera 10 can be moved along a straight line (i.e. a chord) as depicted in FIG. 1. This will not substantially affect the quality of the exposed latent three dimensional image on photosensitive element 18 due to the slight difference between arc and chord length.

Following exposure of image elements 26 on photosensitive element 18, the latent image may be developed by normal methods used in developing photographic film or other light sensitive emulsions. The developed image is then printed on a web, referred to herein as a precursor image web, and replicated along the longitudinal length of the web using conventional printing techniques. The web may be made of a variety of materials, including, for example, paper stock typically used for magazines. Image elements 26 are aligned generally longitudinally with the web, or in other words, are aligned generally on the machine direction. As discussed below, however, it is preferred that the image elements are disposed at a slight angle to the true machine direction.

To create the illusion of three dimensionality, the precursor image web must be optically combined with a lenticular lens. The lenticules of the lenticular lens are aligned with the image elements 26 so that a person viewing the images on the precursor image web will perceive them as being three dimensional. Forming the lenticular lens and aligning it with image elements 26 of the precursor image web is a precision operation performed by a web apparatus 30, shown generally in FIGS. 2 and 3.

Figures 2, 7:
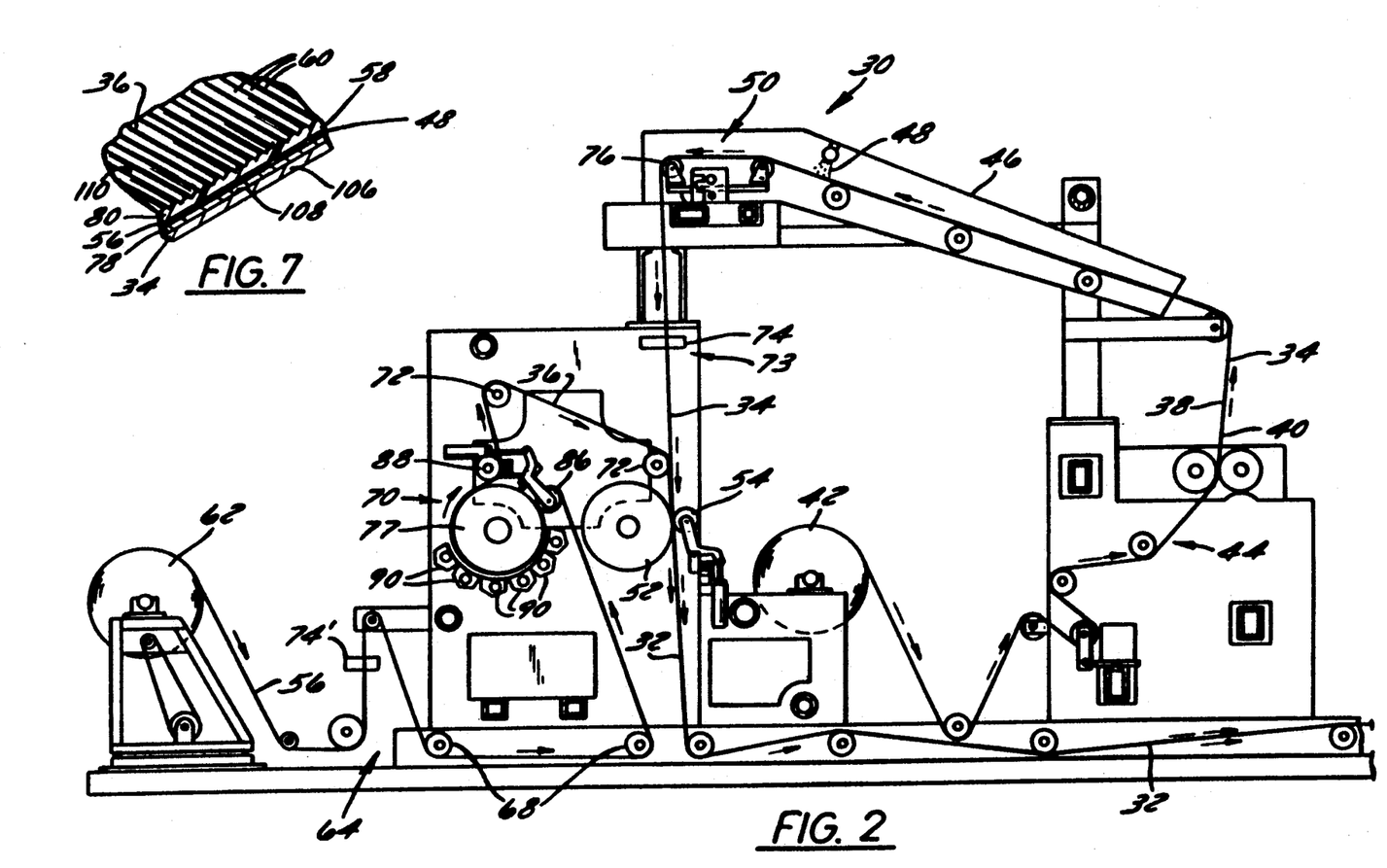
FIG. 2 is a front elevation view showing the formation of a graphic image web by combining a precursor image web with a lenticular lens web.
FIG. 7 is a side view of the graphic image web which includes the precursor image web combined with the lenticular lens web.
Figure 3:
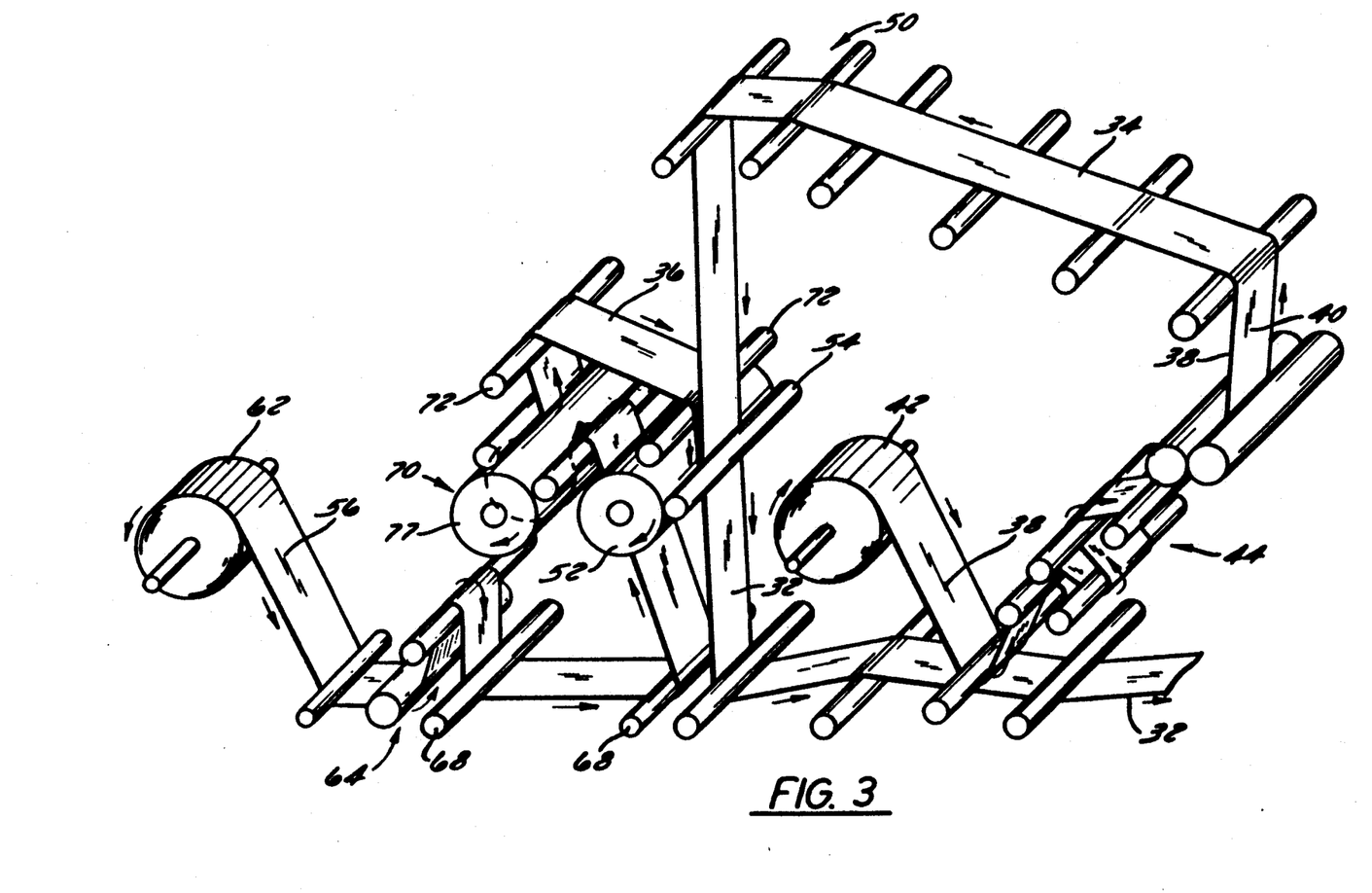
FIG. 3 is a schematic perspective view showing the paths of travel of the precursor image web and the lenticular lens web as they are combined.

Web apparatus 30 is used to combine a precursor image web 34, including image elements 26, with a congruent lenticular lens (which may be left blank, printed with ordinary two dimensional images, or printed with image elements) web 36. Precursor image web 34 includes a back side 38 and a three dimensional or 3-D printed side 40 which is placed in registry with lenticular lens web 36.

In the preferred embodiment, shown generally in FIG. 2, a printed roll 42 of precursor image 34 is mounted in web apparatus 30. Precursor image web 34 translates through a tensioner assembly 44 and then through a hood 46 where an adhesive 48, such as Morton International Blend 2359 pressure sensitive adhesive, is applied. Precursor image web 34 also moves through an optional lateral registration assembly 50 which slaves precursor image web 34 to lenticular lens web 36 so that they are in proper lateral or transverse registry when combined into graphic image web 32. Registration assembly 50 is optional because it has been found that in some applications lateral registration is not required.

Once precursor image web 34 and lenticular lens web 36 are properly aligned, with or without the assistance of registration assembly 50, the webs are pressed together between a base roll 52 and a biased pressure roll 54. Pressing web 34 and web 36 against base roll 52 allows adhesive 48 to convert the two webs into single graphic image web 32.

In the preferred method for forming lenticular lens web 36, a flexible web 56 is combined with a flowable resin 58. Flowable resin 58 is formed into a plurality of lenticules 60 and cured so that lenticules 60 maintain their shape (see FIG. 4). Flexible web 56 preferably comprises a transparent plastic material such as polyester, although other flexible relatively transparent materials could be used. A plastic roll 62 of flexible web 56 is mounted in web apparatus 30 and supplies the flexible web 56 for combination with resin 58. When web apparatus 30 is operating, web 56 moves through a tensioner assembly 64, around a plurality of guide rolls 68, and into a lenticule forming station 70 (discussed below). After moving through forming station 70, flexible web 56 moves around additional guide rolls 72 and then into contact with precursor image web 34 at base roll 52.

As mentioned above, it is important that precursor image web 34 and lenticular lens web 36 are optically aligned when combined between base roll 52 and biased pressure roll 54. Preferably, lenticules 60 have approximately the same cross-sectional dimensions and focal lengths as lenticules of lenticular film assembly 16. This allows each lenticule 60 to be linearly aligned with a single image element 26 on the precursor image web 34.

If lenticules 60 are large in cross-section, a better three-dimensional effect is achieved by laterally aligning a single lenticule directly over each image element 26. However, as lenticules 60 and the corresponding image elements 26 are made narrower, it has been determined in accordance with the present invention that the need for precise lateral alignment is reduced. A desired three dimensional effect is produced by laminating precursor image web 34 to lenticular lens web 36 so that the lenticules 60 are linearly aligned with image elements 26. Proper linear alignment prevents distortion due to the crisscrossing of lenticules 60 with image elements 26.

In the preferred embodiment, the number of the lenticules 60 area is at least 100 per inch. At this density of lenticules, a desired illusion of three dimensionality may be achieved without the use of lateral registration assembly 50. In the most preferred embodiment, the density of the lenticules 60 is at least 300 per inch. This eliminates the need for registration assembly 50 and also provides a short lenticule focal length to facilitate an extremely thin graphic image web 32.

In some cases, it may be desirable to alter the orientation of lenticules 60 with respect to image elements 26 to optically align them in a manner which produces moire patterns. However, it is generally desirable to avoid any formation of moire patterns.

When lateral registration is required, registration assembly 50 preferably comprises an ultrasonic guidance system. Ultrasonic guidance system 73 uses a pair of ultrasonic sensors 74 and 74', each of which produce an ultrasonic beam which tracks the edge of the web it is monitoring. Sensor 74 monitors an edge of precursor image web 34 while sensor 74' monitors the edge of flexible web 56. The frequency of the ultrasonic beam changes as it passes through different materials. Thus, the frequency of the beam passing through a web is different from the frequency of the beam as it passes through atmosphere. The ultrasonic beam either passes completely through the atmosphere, completely through the web, or partially through each, thereby allowing sensors 74 and 74' to read precisely the lateral position of each web. The preferred guidance system is the Model A9H manufactured by FIFE Corporation.

Since it has been determined that flexible web 56 tends to retain its lateral position, it is preferable to adjust the lateral position of precursor image web 34 to laterally align lenticular lens web 36 and precursor image web 34 prior to laminating them into single graphic image web 32. To obtain this lateral registry, the sensors, 74 and 74', supply an output signal to a controller which, in turn, provides output signals which control a guide roller assembly 76. Guide roller assembly 76 is preferably hydraulically controlled to adjust the position of precursor image web 34 in the lateral direction. Such guide roll assemblies are commonly known and used in the printing industry.

Other types of guidance systems may also be used to provide precise lateral registry of the webs. For example, a laser guidance system which uses a laser beam to track the edge of each web may be used. Additionally, a stylus guidance system could be used. In such a stylus guidance system, a stylus cooperates with a sensor to track a ridge or a groove disposed along the edge of a web, preferably the lenticule lens web. It is important to note that with any of these guidance systems, the groove, ridge or edge being tracked must be straight so that the webs can be accurately registered and combined.

In the embodiment illustrated, the precursor image web 34 is slaved to the lenticular lens web 36. However, registration assembly 50 could be connected to slave the lenticular lens web 36 to precursor image web 34. In either case, the lateral registration of webs 34 and 36 occurs during the translation of each web prior to laminating webs 34 and 36 to form graphic image web 32. This process allows efficient production of commercially viable lengths of graphic image web 32 when precise lateral registration is required.

To facilitate efficient production of graphic image web 32, lenticular lens web 36 is created during the translation of flexible web 56 through web apparatus 30. As shown generally in FIG. 5, lenticule forming station 70 comprises a coating roll 77 around which flexible web 56 translates in an arcuate path. Flexible web 56 includes an inner surface 78 which is later adhered to the 3-D printed side (i.e. the image side) 40 of precursor image web 34. Flexible web 56 also includes a receiving surface 80 on which the flowable, curable resin is deposited. Flowable resin 58 may be applied directly to receiving surface 80, but in a preferred embodiment, resin 58 is applied to a coating roll 77 which then rotates into cooperation with receiving surface 80 as shown generally in FIG. 4. Flowable resin 58 is applied by an applicator 82 which creates a reservoir 84 of flowable resin 58 on the surface of coating roll 77. However, other methods of applying flowable resin, such as by spraying it onto coating roll 77, may be used without departing from the scope of the invention.

Figure 4:
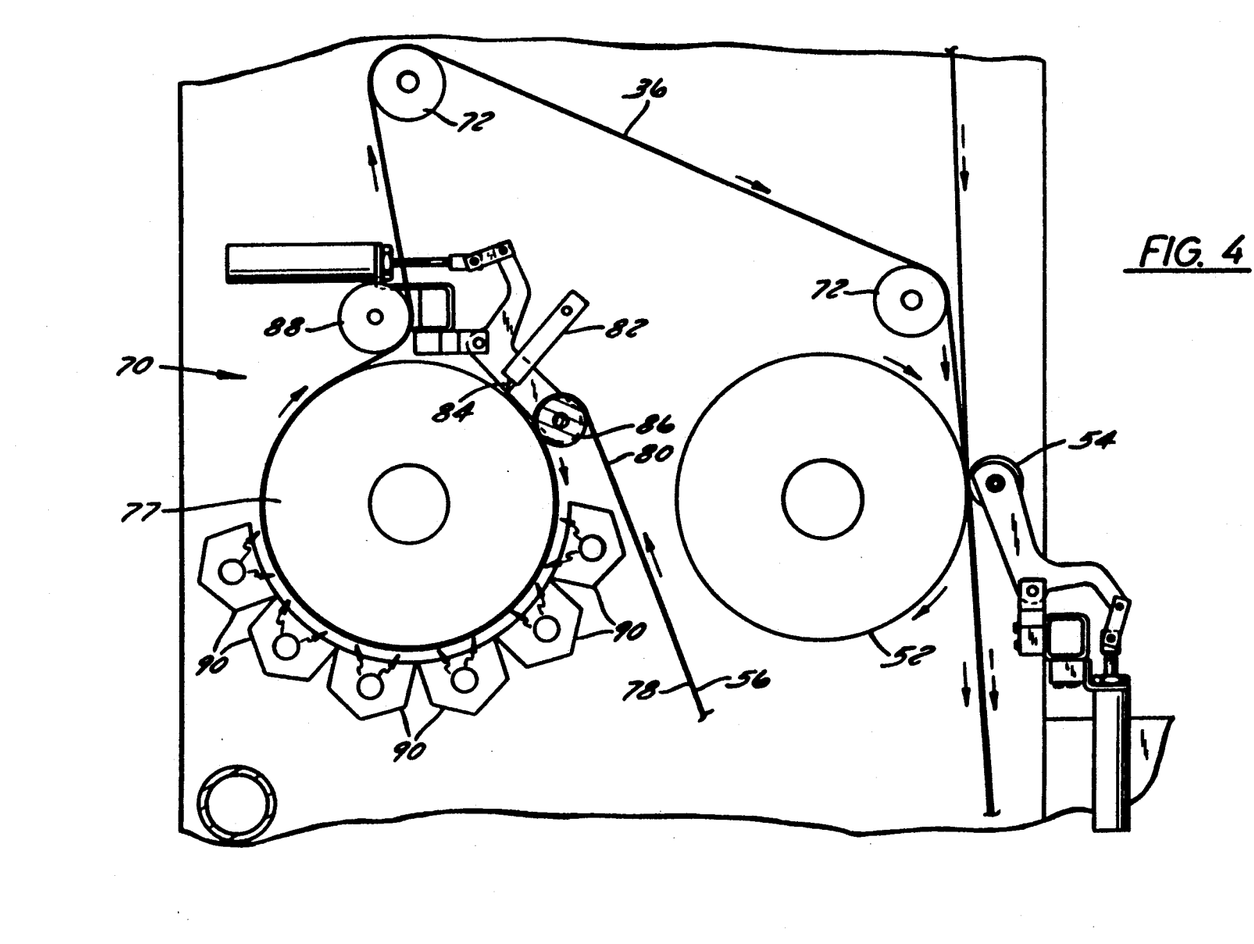
FIG. 4 is a schematic side view of the relief cut roll which forms the lenticules in the lenticular lens web.

As flexible web 56 moves into lenticule forming station 70 it is routed around a tension nip roller 86 and then into contact with coating roll 77 in close proximity and on the downstream side of applicator 82. Thus, reservoir 84 is held between nip roller 86 and coating roll 77 so that receiving surface 80 of flexible web 56 is uniformly wetted with flowable resin 58. Once surface 80 is wetted, the desired optical surface pattern is formed in the flowable resin 58 on flexible web 56.

Coating roll 77 is relief-cut in a pre-defined optical surface pattern. This optical surface pattern is preferably a recessed pattern of lenticules which imparts a convex lenticular pattern to the flowable resin 58. This desired pattern is maintained as flexible web 56 moves through lenticule forming station 70 and is cured prior to any leveling which would materially impair the desired lenticular pattern. The lenticular pattern is maintained by holding flexible web 56 in contact with coating roll 77 until it moves into proximity with a tension roller 88 disposed downstream of coating roll 77. In the preferred embodiment, flowable resin 58 is a UV curable resin and is cured before flexible web 56 moves out of contact with coating roll 77. A plurality of UV radiators 90 are disposed about coating roll 77 in such a manner that the UV rays are directed through the base of transparent flexible web 56 and into resin 58 while it is maintained in the desired lenticular pattern against relief cut coating roll 77.

The relief cut pattern extends in an arcuate path around the circumference of coating roll 77. Preferably, the pattern is a screw pattern wherein one continuous relief cut groove, corresponding to the desired physical shape each lenticule, continually wraps around the coating roll 77 similar to the thread of a screw. Thus, the relief cut groove has a given pitch angle dependent on the size of the groove and the diameter of coating roll 77. Such a continuous groove requires a coating roll 77 of sufficient size so that the pitch of the groove is negligible. This ensures that the lenticular pattern formed in flowable resin 58 is nearly linearly aligned with the machine direction of lenticular lens web 36.

Roll 77 is relief cut to correspond to the desired number and the desired shape of lenticules 60 both of which can vary substantially depending on various image web manufacturing parameters and the desired three dimensional effect. To obtain a thin image web 32, it is desirable to have 100 or more lenticules per inch so that the convex lenticule has a short focal length and the thickness of lenticular lens web 36 is minimized. As mentioned above, a higher density of lenticules reduces or even eliminates the need for precision lateral registration.

The preferred shape of lenticules 60 is of a half cylinder split longitudinally, as shown generally in FIG. 7.

However, the shape of the lenticule can be adjusted to facilitate shorter focal lengths without having as great a multiplicity of lenticules per inch. Each lenticule can be formed with greater curvature at its apex than throughout the remainder of the lenticule to provide a shorter focal length with a broader overall lenticule cross section. An example of such a lenticule is one having a hyperbolic cross section.

To obtain optical alignment for the greatest three dimensional effect, the images on precursor image web 34 are tilted slightly with respect to the machine direction of web 34. The tilt of the images corresponds to the pitch of the lenticules 60 so that the image elements 26 are linearly aligned with lenticules 60. In the preferred embodiment, the tilted images are created on precursor image web 34 with a web offset press, although other types of presses such as gravure or flexographic presses can also be used.

Figure 5:
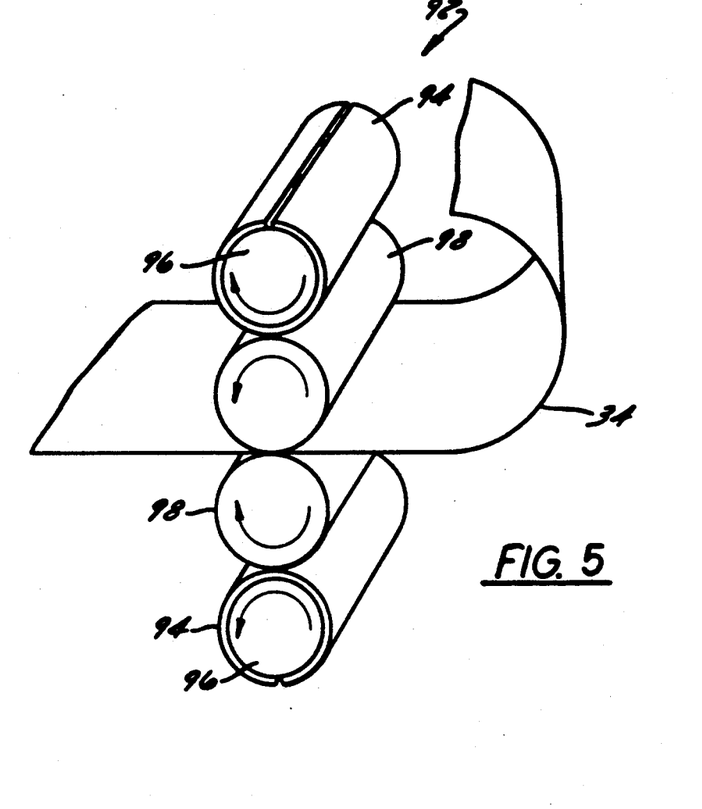
FIG. 5 is a schematic perspective view of a printing unit used in a web offset press.

A web offset press uses a printing unit 92 shown schematically in FIG. 5. Ink is applied to an image carrier, such as a plate 94, which wraps around a plating cylinder 96. Plate 94 is etched with the desired image and transfers the ink held by the etched image to a blanket cylinder 98 which, in turn, transfers the image to precursor image web 34. Images may be printed on both sides of the precursor image web 34, as shown in FIG. 5. Usually, a series of printing units 92 is required since only a single color will be applied at each printing unit 92.

To obtain optical alignment, the images are printed on precursor image web 34 at an angle which matches the pitch angle of the screw threads on coating roll 77. This is preferably accomplished by one of two different methods. According to one method, plate cylinder 96 is cocked or rotated so that it is no longer perpendicular to the machine direction of precursor image web 34. The angle of rotation from perpendicular approximately matches the pitch angle imparted to lenticules 60. Accordingly, the cocked plate cylinder 96 transfers the image to blanket cylinder 98 at the same angle so that the image elements 26 and lenticules 60 will be linearly aligned when graphic image web 34 and lenticular lens web 36 are combined.

Figure 6:
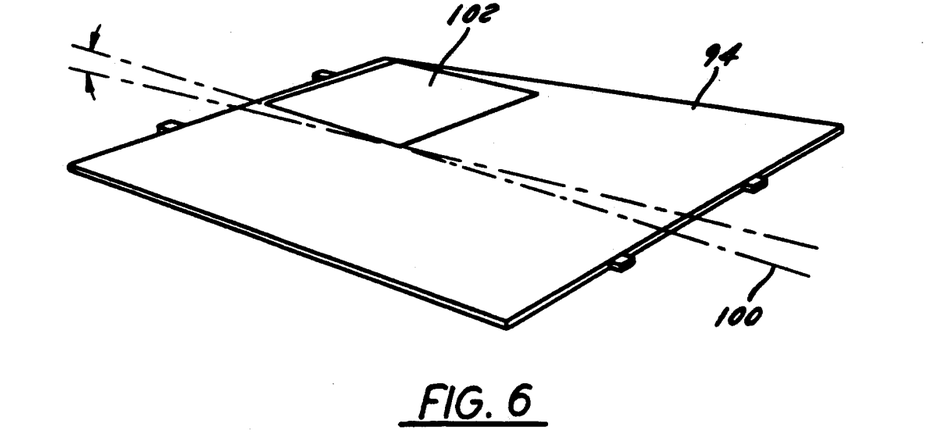
FIG. 6 is a schematic perspective view of a printing plate.

According to the second method, the images are etched on plate 94 at the desired pitch angle as shown in FIG. 6. Plate 94 includes an axis 100 which is aligned with the machine direction of precursor image web 34. However, when an image 102 is etched in plate 94, it is oriented at an angle with respect to axis 100. This angle corresponds approximately with the pitch angle of the recessed screw threads on coating roll 77. Thus, like before, as precursor image web 34 is laminated to lenticular lens web 36, lenticules 60 will be linearly aligned with image elements 26.

Following the curing of flowable resin 58 and the formation of lenticular lens web 36, lenticular lens web 36 moves around guide rolls 72 and into contact with precursor image web 34 where it is adhered to precursor image web 34 to form graphic image web 32 as described above. As shown generally in FIG. 7, graphic image web 32 typically comprises a layer of printing paper 106 on which are printed the image elements 26 creating a printing layer 108. A layer of relatively transparent adhesive 48 is disposed on printing layer 108 and secures inner surface of flexible web 56 to precursor image web 34 (which includes paper 106 and printing layer 108). A pre-defined topography 110 is formed from curable resin 58 and disposed on receiving surface 80 of flexible web 56. In the preferred embodiment, the pre-defined topography 110 is formed in the pattern of lenticules 60 having the desired configuration and optical qualities so that when image elements 26 are viewed through lenticules 60 and flexible web 56, the illusion of three dimensionality is created. In this respect, it is desirable that each lenticule be of generally the same width as each image element 26 and that each lenticule 60 has a focal length which coincides with its distance from printing layer 108.

Numerous materials may be used to create the various layers which are combined to form graphic image web 32. For example, flexible web 56 and lenticules 60 made be made from polycarbonate and laminated to a polycarbonate precursor image web 34. In another situation, it may be advantageous to use Tyvek, a material manufactured by the DuPont Company, as the precursor image web. A wide variety of materials, including synthetics and nonsynthetics, those with woven or nonwoven fibers, and those with oriented or nonoriented fibers may be used to form one or more of the precursor image web 34, flexible image web 56, or lenticules 60.

Figure 8:
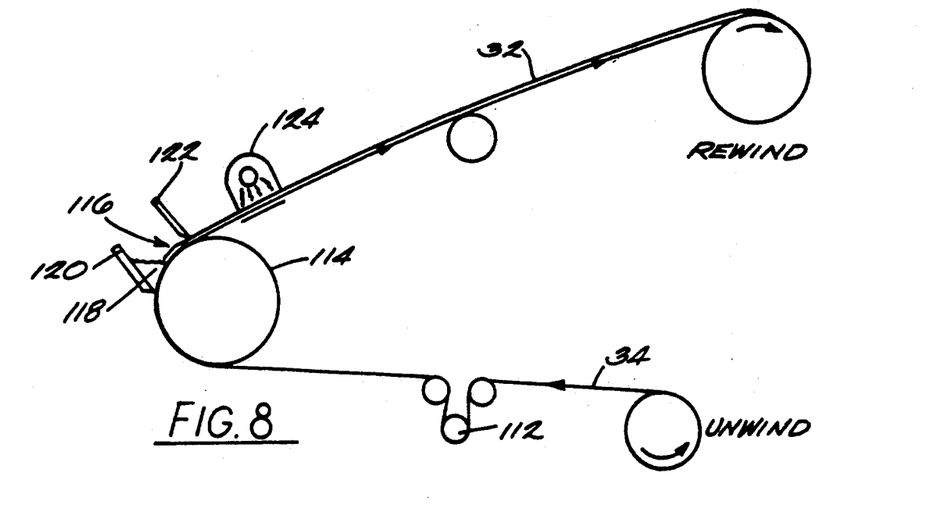
FIG. 8 is a front elevation view showing formation of a graphic image web by combining a precursor image web with a lenticular coating.

Referring now to FIG. 8, an alternative embodiment of the invention in which the lenticular lens is formed by applying a coating to the precursor image web will now be described. It should be understood that the prior art has concentrated mainly on formation of the lenticular lens without corresponding concern for the optical alignment of the lenticular lens with the base film or precursor image web to which it is joined. In an effort to minimize distortion which occurs when a base film or precursor image web becomes skewed or misoriented in its path of travel, the invention incorporates the combination of a specially processed precursor image web with a curable lenticular lens coating.

In accordance with the invention, precursor image web 34 is formed and processed as described above wherein the image elements are slightly tilted with respect to machine direction of web 34. Web 34 passes through a tensioning device 112 and around a coating roll 114 where a fluid coating 116 is directly applied from a source 118. A fountain blade 120 is utilized to wipe off excess coating 116 from roll 114. Web 34 then passes under a forming member 122, such as a knife or rotating bar, relief cut with the desired lenticular pattern having a pitch corresponding to the tilt angle of the image elements printed on web 34 as before described. After the lenticular coating has been formed, web 34 travels past an ultraviolet lamp, or is otherwise cured, such as by chemical curing, drying, infrared or ultrasonic beam. Composite graphic image web 32 is thus continuously formed such that the lenticules in coating 116 are in registration with the tilted image elements in precursor image web 34.

It should be appreciated that precursor image web 34 may be coated with a lenticular lens in a variety of modes including direct gravure and flexographic and in combination with various laminations.

Figure 9:
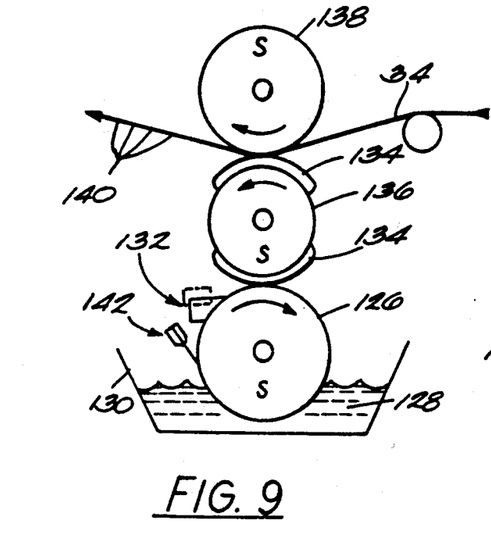
FIGS. 9 and 10 are front elevation views showing formation of a graphic image web by combining a precursor image web with a spot lenticular coating.

Another particular form of the invention contemplates improved spot or selective lenticulation on the precursor image web. In one such arrangement shown in FIG. 9, a rotating coating or anilox roll 126 transfers resin or coating 128 from a reservoir 130 or manifold 132 to the segments 134 of a plate cylinder 136 which is relief cut with the lenticular pattern again matching the angular orientation of the image elements on the precursor image web 34. Rotation of plate cylinder 136 thus transfers segmented or spot lenticulation to precursor image web 34 routed between a displaceable backup cylinder 138 and plate cylinder 136. After the lenticular coating 128 has been deposited on selected areas of the web, a curing source 140, such as an ultraviolet radiator or the like, is used to cure lenticular coating. Once again a doctor blade 142 is used to remove excess coating 128 from roll 126.

Figure 10:
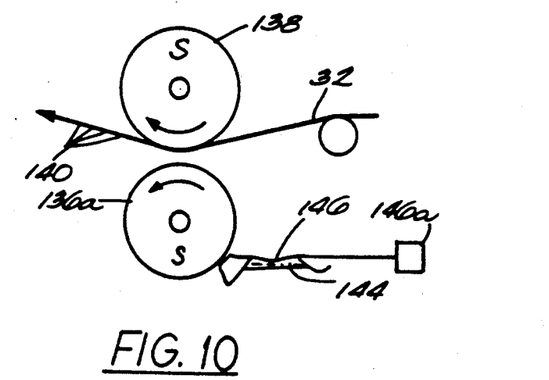

FIG. 10 shows another embodiment wherein coating 144 from a manifold 146 governed by a timing control 146a is directly applied to a relief cut gravure cylinder 136a before spot transfer to web 32.

Figure 11:
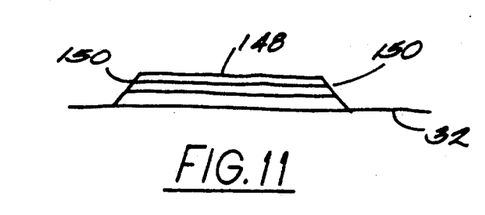
FIG. 11 is an enlarged view of a graphic image web formed with spot lenticulation.

Segments 134 on plate cylinder 136 are constructed of urethane, rubber, copper or stainless steel and are interchangeable to provide various tapered effects of the lenticular coating. Any number of coating stations, or decks, with various sized segments 134 may be utilized to produce web 32 so as to build up a layered spot lenticulation such as shown in FIG. 11 wherein a three-layered coating 148 results in a spot lenticulation of generally frustro-conical or trapezoidal cross section having downwardly sloping sides 150 to yield a certain effect.

It will be understood that the foregoing description is of a preferred exemplary embodiment of this invention, and that the invention is not limited to the specific form shown. For example, the lenticules may be of different shape or size, different types of curable resin may be used, and the arrangement of various components in web apparatus may be changed. These and other modifications may be made in the design and arrangement of the elements without departing from the scope of the invention as expressed in the appended claims.

What is claimed is:

1. A method for forming a graphic image having the image of three-dimensionality by joining a precursor image with a superimposed lenticular film through which said precursor image is to be viewed, the improvement comprising the step of applying a lenticular coating having a plurality of lenticules to a precursor image web having a plurality of image elements to produce a graphic image web in which the perceptible image possesses photographically acceptable quality, wherein said image elements of said precursor image web are printed at an angle which corresponds to the pitch of said lenticules in said lenticular coating.

2. The method of claim 1, wherein said lenticular coating includes lenticules of sufficient density to produce said graphic image web in which the perceptible image possesses photographically acceptable quality.

3. The method of claim 1, wherein said step of applying a lenticular coating occurs during translation of said precursor image web and said lenticular coating.

4. A method for forming a graphic image web including a precursor image web combined with a congruent lenticular lens to produce the illusion of three dimensionality in a visually perceptible image on said graphic image web, said method comprising the steps of:
defining an image field including an object to be viewed;
imagewise exposing said object onto a photographically sensitive element over a plurality of spatially disparate views through a lenticular lens having a prescribed optical geometry;
developing the latent image on said element;
printing the developed image to form said precursor image web; and
applying a lenticular lens coating having a plurality of lenticules to said precursor image web while said precursor image web is translating in a machine direction to create said graphic image web having graphic information of photographically acceptable quality imparted with the illusion of three dimensionality.

5. The method of claim 4, wherein said step of imagewise exposing said object through said lenticular lens over a plurality of spatially disparate views creates a plurality of image elements on said photographically sensitive member, each image element being defined by a plurality of condensed image bands, each image band representing a particular spatially disparate view, and further wherein said plurality of image elements are developed on said photographically sensitive member and printed onto said web.

6. The method of claim 5, wherein said step of imagewise exposing said object is over an infinite number of spatially disparate views to create uninterrupted image elements, each image element being defined by an infinite number of said image bands.

7. The method of claim 5, wherein the step of printing the developed image is replicated along the length of said precursor image web.

8. The method of claim 5, further comprising the step of axially aligning said image elements on said precursor image web with said lenticules of said lenticular lens coating so that said lenticules are disposed generally over said image elements in a one-to-one relationship.

9. The method of claim 4, wherein said lenticules are oriented at a pitch angle to said machine direction.

10. The method of claim 4, wherein said step of applying a lenticular lens coating includes applying a curable resin to said precursor image web, impressing said resin by translating said precursor image web around a forming member having a relief cut lenticular pattern, and curing said resin.

11. The method of claim 10, wherein said forming member includes a relief cut pattern which impresses said resin to form said lenticules oriented at said pitch angle to said machine direction.

12. A method for producing a spot lenticulated graphic image web having the image of three dimensionality by joining a precursor image with a lenticular film through which said precursor image is to be viewed, the improvement comprising the step of selectively applying a lenticular coating having a plurality of lenticules to selected areas of a precursor image web having a plurality of image elements to produce a graphic image web in which the perceptible image possesses photographically acceptable quality, wherein said image elements of said precursor image web are printed at an angle which corresponds to the pitch of said lenticules in said lenticular coating.

13. The method of claim 12, wherein said precursor image web passes between a backup cylinder and a plate cylinder, said plate cylinder having interchangeable segments formed with a lenticular pattern matching the pitch of said lenticules in said lenticular coating.

14. The method of claim 12, wherein said spot lenticulated graphic image web carries a spot lenticulation comprised of a layered formation of said lenticular coating which is trapezoidal in cross section.

15. The method of claim 12, wherein said precursor image web passes between a back up cylinder and a relief cut gravure cylinder.

* * * * *